United States Patent [19]
Funk et al.

[11] Patent Number: 5,836,042
[45] Date of Patent: Nov. 17, 1998

[54] MODULAR WINDSHIELD WIPER DRIVE SUPPORT FRAME

[75] Inventors: Gregory Allen Funk, Franklin; Michael Charles Nazione, Columbia; Franz Buechele, Lawrenceburg, all of Tenn.

[73] Assignee: ACD Tridon Inc., Burlington, Canada

[21] Appl. No.: 617,445

[22] Filed: Mar. 19, 1996

[51] Int. Cl.⁶ ..................................................... B60S 1/06
[52] U.S. Cl. ..................... 15/250.3; 15/250.31; 248/200; 74/42; 296/96.17; 296/192
[58] Field of Search ................................ 15/250.3, 250.31, 15/250.29, 250.27; 296/192, 194, 96.15, 96.17; 74/42, 43, 51, 96, 78; 248/200, 214; 318/DIG. 2

[56] References Cited

U.S. PATENT DOCUMENTS

| | | | |
|---|---|---|---|
| 3,793,671 | 2/1974 | Gebhard | 15/250.27 |
| 3,874,249 | 4/1975 | Carpenter | 15/250.27 |
| 4,857,812 | 8/1989 | Mochizuki et al. | 318/DIG. 2 |
| 5,074,613 | 12/1991 | Unterborn et al. | 15/250.3 |
| 5,142,941 | 9/1992 | Amann et al. | 15/250.3 |
| 5,165,159 | 11/1992 | Egner-Walter et al. | 15/250.31 |
| 5,222,706 | 6/1993 | Hoshino | 15/250.31 |
| 5,251,861 | 10/1993 | Hayashi | 15/250.001 |
| 5,261,286 | 11/1993 | Hayashi | 15/250.3 |
| 5,271,120 | 12/1993 | Eustache et al. | 15/250.3 |
| 5,381,582 | 1/1995 | Lee et al. | 15/250.3 |
| 5,396,681 | 3/1995 | Hara | 15/250.3 |
| 5,441,227 | 8/1995 | Hayashi | 15/250.3 |
| 5,453,649 | 9/1995 | Blanchet | 310/71 |

FOREIGN PATENT DOCUMENTS

| | | |
|---|---|---|
| 0 306 361 | 3/1989 | European Pat. Off. . |
| 0 359 733 | 3/1990 | European Pat. Off. . |
| 2621287 | 10/1988 | France . |
| 2335356 | 7/1973 | Germany . |
| 2319840 | 11/1973 | Germany .............................. 15/250.3 |
| 2529949 | 8/1976 | Germany .............................. 15/250.3 |
| 1128447 | 9/1968 | United Kingdom . |
| 1543137 | 3/1979 | United Kingdom . |
| 2195880 | 4/1988 | United Kingdom . |
| 2219932 | 12/1989 | United Kingdom . |
| 2227926 | 8/1990 | United Kingdom . |
| 2228188 | 8/1990 | United Kingdom . |

Primary Examiner—Gary K. Graham
Attorney, Agent, or Firm—Bacon & Thomas PLLC

[57] ABSTRACT

A modular support frame for a windshield wiper drive having integrally formed mounting brackets for securing the frame to a vehicle body, and integrally formed pivot bosses for pivot drive shafts connected to windshield wiper arms. A motor carrier for supporting a motor drive coupled to a linkage for rotating the wipers is integrated into the frame. The motor carrier has an end plate integrally formed with the frame which is transverse to a longitudinal axis defined by the motor shaft and which is apertured for receiving the motor shaft. An integrally formed splash cover extends outwardly on one side of the end plate, so as to partly cover a housing for the motor drive, the splash cover defining a longitudinally-extending opening adapted to axially receive the motor drive for assembly into the support frame. The arrangement facilitate assembly of the motor drive directly into the support frame where it can easily be accessed for servicing.

4 Claims, 4 Drawing Sheets

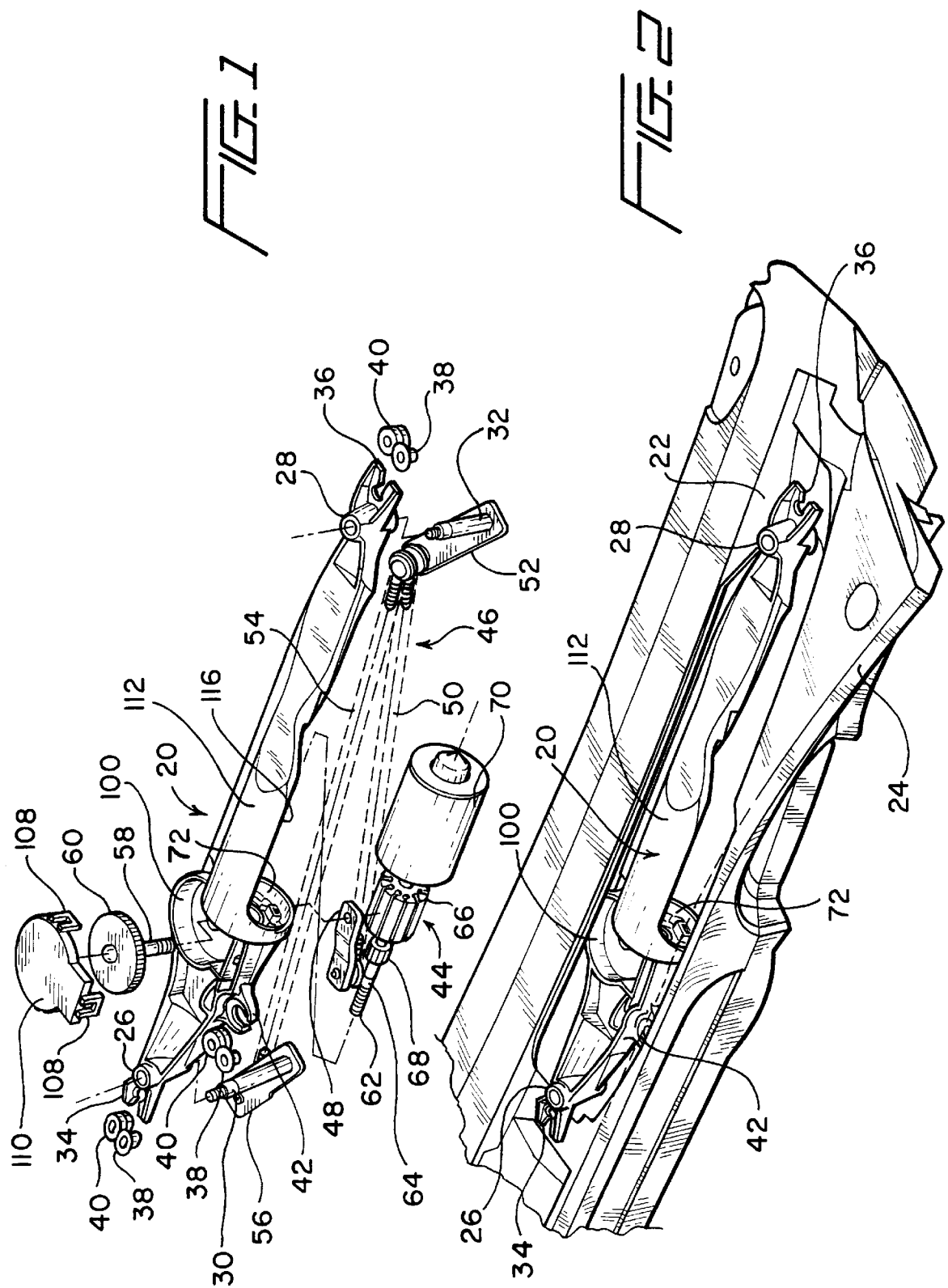

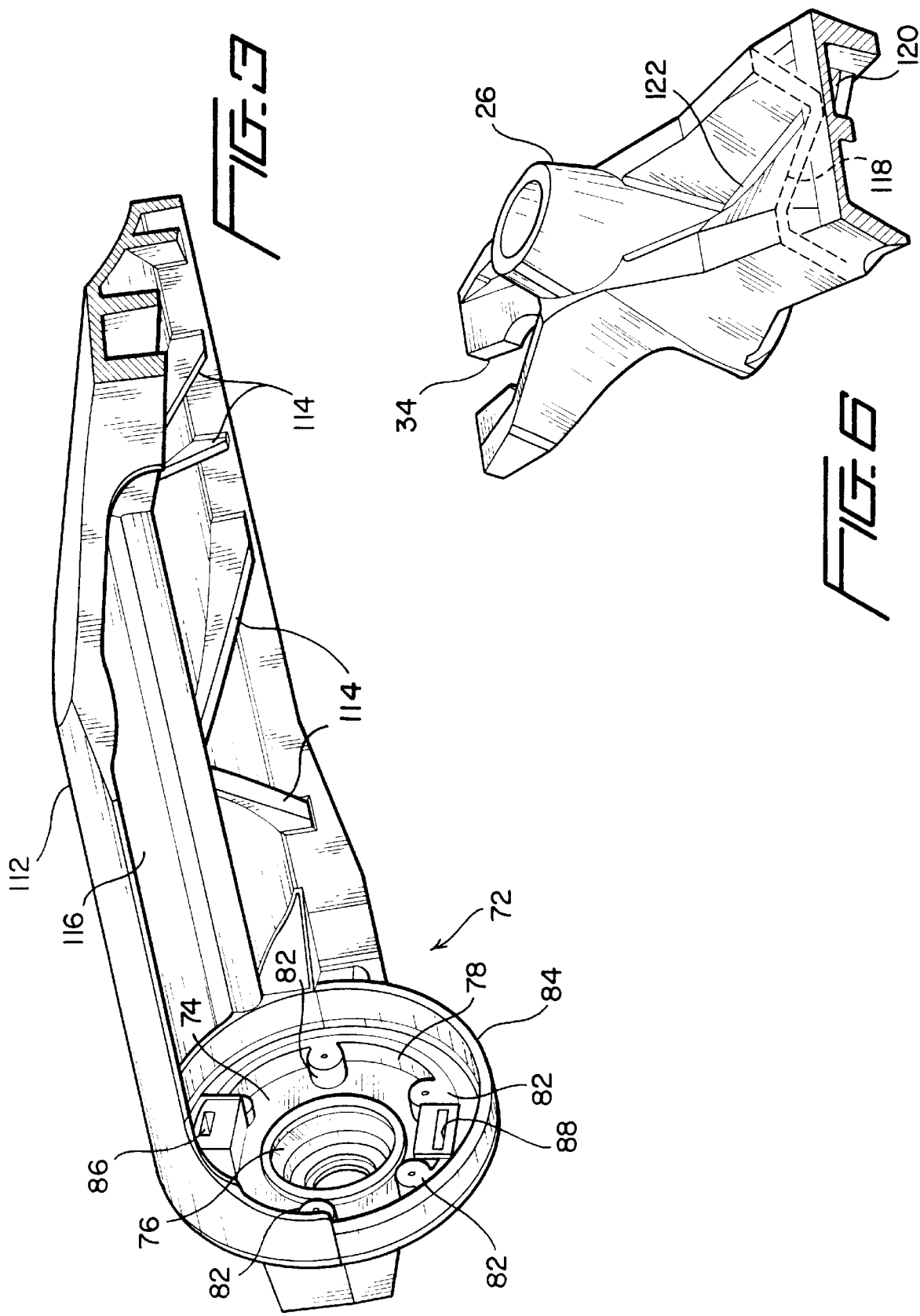

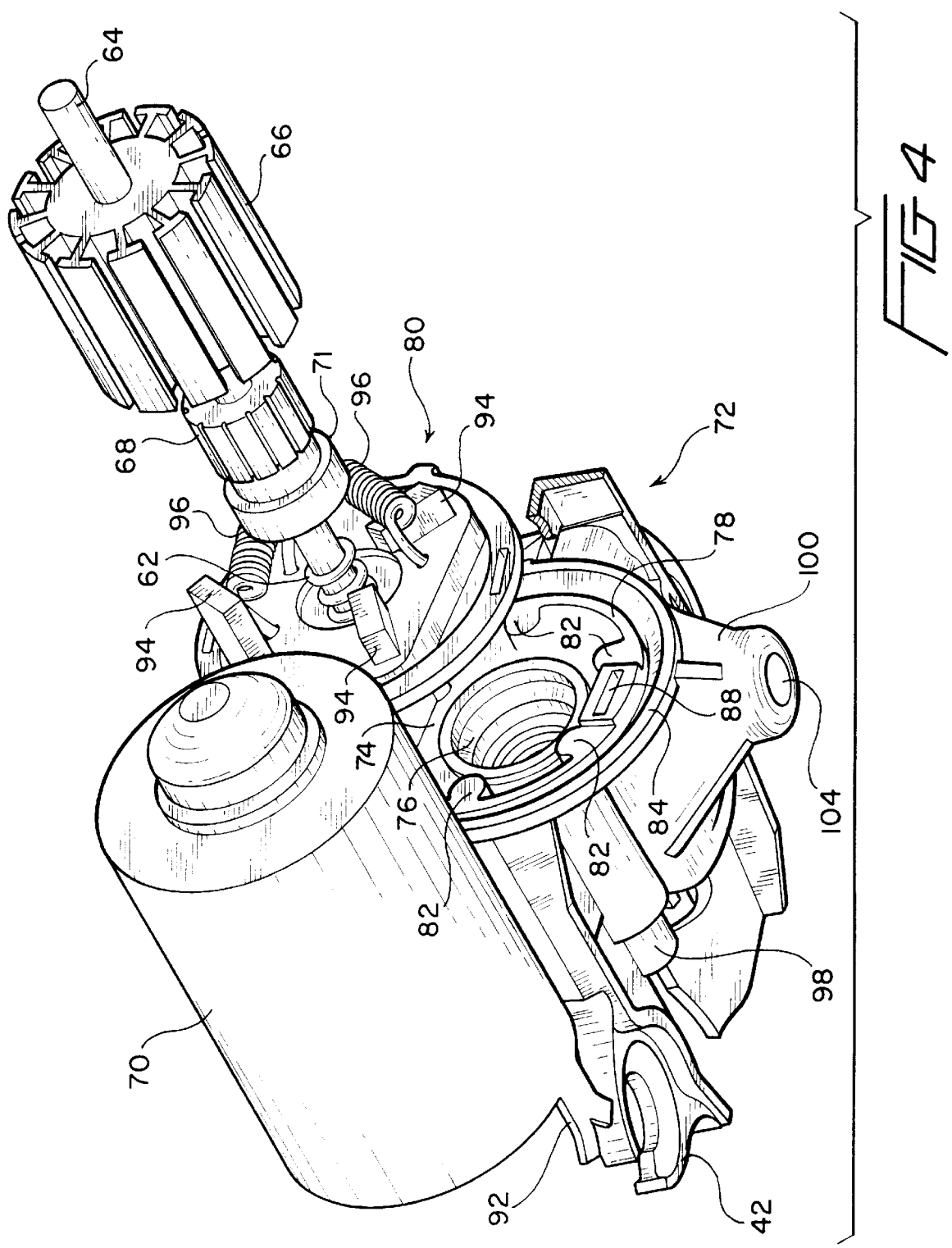

MODULAR WINDSHIELD WIPER DRIVE SUPPORT FRAME

FIELD OF THE INVENTION

This invention relates to a modular windshield wiper drive support frame. The frame is used to support a drive assembly for oscillating windshield wiper arms and is fixed to a vehicle body, usually in a cramped space known as the cowl, defined between the engine compartment and a firewall which isolates the passenger compartment.

BACKGROUND OF THE INVENTION

Typically, the drive assembly includes a pair of spaced-apart pivot drive shafts which have threaded ends and which receive a cooperating termination of the wiper arms, a motor drive unit, and a gear reduction unit which has an output shaft connected to a linkage assembly. The linkage assembly will often include a crank arm and push rod or connecting rod to oscillate levers supporting the pivot drive shafts. Details of the linkage assembly are only incidental to this invention.

The motor vehicle industry has recognized that there are advantages to be realized in providing a modular frame, that is, one adapted to carry the motor drive assembly and any gear reduction unit as well as the associated link mechanism in a manner that will allow these component parts to be pre-assembled so that only a single unit needs to be mounted to the vehicle body.

Typically, the frame has pivot bosses for receiving pivot drive shafts to mount the wiper arms and mounting slots for attaching the frame to the vehicle body.

It has also been recognized that, in the current arrangement where the wiper motor is mounted very close to the passenger compartment, the noise made when the motor is in operation is often audible to the occupants of the vehicle.

Accordingly, several frames have been developed for the purpose of minimizing the number of component parts.

In the case of a pipe frame, a rigid steel tube includes terminations for receiving the pivot drive shafts and a plate or other support for mounting the motor drive assembly is attached, usually by welding, to the steel tube. The motor drive assembly is a discrete body with a housing which is mounted to the plate by means of fasteners.

Other modular frames such as GB 2,219,932 disclose a plastics moulded frame having integrally formed pivot bosses for the wiper arms and mounting supports for attachment to the vehicle body. A mounting platform for attaching the motor housing is integrally formed with the frame and defines a hole for receiving a transversely disposed cylindrical motor assembly through the platform. In EP 0359733, an opening is formed in the body of the frame to accommodate a motor drive assembly unit mounted to a peripheral flange and axially disposed so that it lies balanced in the plane of the frame.

While the above-referenced patents show attempts to integrate a motor drive assembly into the frame, the motor assemblies are encased in a discrete housing which is itself attached to the body of the frame.

In U.S. Pat. No. 3,874,249 a sheet metal frame is shaped at one end into a bracket to accommodate a pivot boss that receives a rotatable drive pivot for a single wiper arm and, at the other end, the sheet metal is bent to encase a motor drive assembly. In U.S. Pat. No. 3,793,671, the motor assembly is housed in an elongated casing which is horizontally divided into an upper and a lower shell that extend longitudinally and form respective chambers at opposite ends of the frame to house one of a pair of reduction gears; and a linkage each associated with a respective wiper. The motor must be transversely loaded into the shells, and the shells fastened to each other prior to mounting in the vehicle.

Neither of these arrangements is suitable for use in association with a series style linkage which is often preferred for synchronization of a pair of wipers.

An object of this invention is to provide a modular frame assembly which minimizes the required component parts by integrating a motor drive assembly into the frame so that a more efficient and durable installation of a wiper drive assembly into a motor vehicle may be achieved.

SUMMARY OF THE INVENTION

In accordance with this invention, there is provided a modular support frame for a windshield wiper drive, the support frame comprising:

a unitary body having integrally formed mounting brackets for securing the frame to a vehicle body;

at least one integrally formed pivot boss for receiving a pivot drive shaft rotatable in said boss and driven to reciprocate a windshield wiper, and an integrated motor carrier supporting a motor drive adapted to drive a motor shaft defining a longitudinal axis and coupled to a crank arm forming part of a linkage adapted to rotate said pivot drive shaft, said motor carrier having an integrally formed end plate transverse to said longitudinal axis and apertured for receiving the motor shaft therethrough and an integrally formed splash cover extending outwardly on one side of said end plate to as to partly cover a housing for the motor drive, the splash cover defining a longitudinally-extending opening adapted to axially receive the motor drive for assembly into said support frame.

In a preferred embodiment of the invention, the end plate is adapted to receive a brush card assembly cooperating with a commutator mounted coaxially on the motor shaft, and the frame has an integrated reduction gear carrier supporting a reduction gear having an output shaft coupling the motor shaft to the crank arm.

BRIEF DESCRIPTION OF THE DRAWINGS

In order that the invention may be more clearly understood, a preferred embodiment is described below with reference to the accompanying drawings, in which:

FIG. 1 is a perspective exploded view showing a modular support frame in accordance with the invention for a windshield wiper drive and a motor drive, a reduction gear and a linkage for rotating windshield wipers (not shown);

FIG. 2 is a schematic perspective view showing the modular support frame of FIG. 1 positioned in the cowl of a vehicle;

FIG. 3 is a partly-sectioned perspective view of a portion of the modular support frame of FIG. 1 drawn to a larger scale and showing an integrated motor carrier;

FIG. 4 is a perspective view showing an assembly drawing of the motor drive and motor carrier;

DESCRIPTION OF PREFERRED EMBODIMENT

Figure 5:
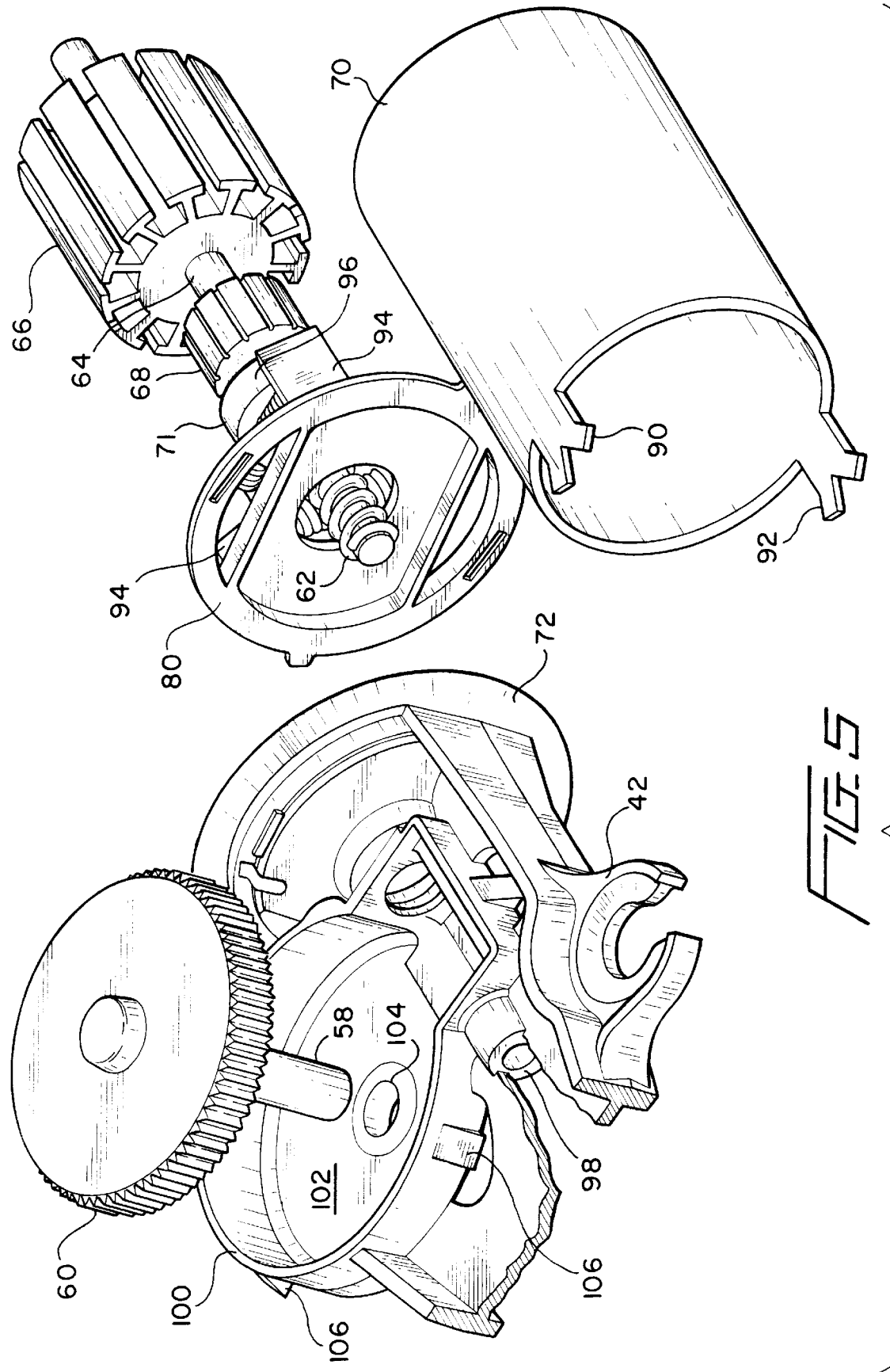
FIG. 5 is a partly-sectioned perspective view of a portion of the modular support frame drawn to a larger scale and showing an integrated reduction gear carrier, and FIG. 6 (drawn adjacent FIG. 3) is a partly-sectioned perspective view of a pivot boss termination forming part of the modular support frame and drawn to a larger scale.

A modular support frame for a windshield wiper drive is generally indicated by numeral 20 in FIG. 1. In use, the modular frame locates in a cowl 22 (FIG. 2) of a vehicle body 24 which is defined between the engine compartment and a fire wall which isolates the passenger compartment of the vehicle.

The modular frame 20 is a unitary body which, in the embodiment drawn, is cast from an aluminum alloy selected to have sufficient toughness to withstand the torsional and vibrational forces which arise in use, whilst still minimizing weight.

The frame 20 extends longitudinally between a pair of integrally formed pivot bosses 26, 28 each defined by a cylindrical wall adapted to receive a pivot drive shaft 30, 32 with threaded terminations for mounting respective windshield wiper arms. It will be noted that the pivot bosses 26, 28 project from the frame 20 so as to define a slightly divergent angle which will be selected in the design of the frame in accordance with the vehicle model so as to ensure contact for proper orientation between the curved glass surface of a windshield and the wiper blades.

Mounting slots 34, 36 extend outwardly from each pivot boss 26, 28 and are adapted to receive respective fasteners 38 which secure the frame 20 to the vehicle body in the cowl 22 which are isolated by bushings 40. A third mounting slot 42 extends outwardly from the frame and is disposed between the pivot bosses 26, 28 so as to lie essentially in the same plane as the other two mounting slots 34, 36.

A motor drive generally indicated by numeral 44 is coupled to a linkage 46 for rotating the wipers. In the embodiment drawn, a series linkage is shown comprised of a crank arm 48 pivotally connected at one end to a push rod 50 mounted to a first lever 52 which supports one of the pivot drive shafts 32. A connecting rod 54 extends between the first lever 52 and a second lever 56 that supports the other pivot drive shaft 30.

The crank arm 48 is apertured to receive the output shaft 58 of a reduction gear 60 which is coupled to a worm gear termination 62 of a longitudinally-extending motor shaft 64.

The motor drive 44 is shown in more detail in FIG. 4 and comprises an armature 66 made of magnetic material and mounted at one end of the motor shaft 64 with an axially-mounted commutator 68 between the armature 66 and the worm gear termination 62. A cylindrical housing 70 with a permanent magnet (not shown) mounted to the interior of the housing is closed at one end and is open at the other end to receive the remaining components of the motor drive 44. Bearings 71 at opposite ends of the motor shaft 64 rotatably support the motor shaft 64 for rotation in the housing 70 at one end (not shown) and in a motor carrier 72 forming part of the modular frame 20 at the other end (FIGS. 4 and 5).

The motor carrier 72 is shown in greater detail in FIGS. 3 and 4 of the drawings where it will be seen that the motor carrier comprises an end plate 74 integrally formed with the frame 20 and disposed transversely to the longitudinal axis defined by the motor shaft 64. A central aperture 76 formed in the end plate is dimensioned to snugly receive one of the afore-mentioned bearings 71 that supports the motor shaft 64. A first peripheral flange 78 extending outwardly from the end plate 74 defines a seat for locating a brush card assembly 80 (FIG. 4) and has radially directed projections 82 which receive fasteners for attaching the brush card assembly 80.

A second peripheral flange 84 radially spaced from the first flange 78 extends outwardly from the end plate 74 and is adapted to cup the open end of the housing 70. Upper and lower slots 86, 88 formed in the end plate 74 receive a pair of diametrically opposite bifurcated mounting tabs 90, 92 (FIG. 5) formed in the housing 70 of the motor drive 44.

One side of the brush card assembly 80 (opposite from the end plate 74) includes a number of brushes 94, of which three are shown in the embodiment illustrated, and a pair of RF coils 96, as is common in the art.

The worm gear termination 62 of the motor shaft 64 extends through the end plate 74 and locates in a boss 98 formed in the frame and spaced from the end plate 74. Between the boss 98 and the end plate 74, the worm gear termination 62 is exposed so that it may be coupled to the toothed periphery of the reduction gear 60 which is seated in a reduction gear carrier 100 integrally formed with the frame 20. The reduction gear carrier 100 has a seat 102 lying in a plane which is orthogonal to the end plate 72 and which is disposed adjacent to the end plate. An aperture 104 formed in the seat 102 receives the output shaft 58 from the reduction gear, the output shaft 58 being generally parallel to the motor carrier 72 so as to connect to the crank arm 48 which, in use, is assembled so as to be positioned below the frame 20 inside the cowl 22. A series of tabs 106 project outwardly from the reduction gear carrier 100 and are adapted to cooperate with clips 108 associated with a cover 110 (FIG. 1) for capturing the reduction gear 60 into the frame.

Returning to FIG. 3, the motor carrier 72 additionally includes a splash cover 112 which is integrally formed with the frame 20 and which extends outwardly on one side of the end plate 74 opposite from the reduction gear carrier 100 towards one of the pivot drive bosses 28. The splash cover 112 is arcuate in cross-section so as to partly cover the housing 70 for the motor drive 44 and is reinforced by transversely-extending ribs 114 formed on the inside of the splash cover adjacent the motor housing 70. The location of some of these ribs 114 is strategically selected to minimize vibration and control frequency in the associated structure. The splash cover 112 defines a longitudinally-extending opening 116 which conveniently provides sufficient space to axially displace the motor shaft 64 into and out of the motor carrier 72, so that the motor drive 44 can be assembled into the support frame and be easily accessed for servicing. The cover also shields the motor from the elements and diverts precipitation into the cowl.

It will be noted that the motor carrier 72 and associated reduction gear carrier 100 are nearer to one of the pivot bosses 26 than the other 28. This arrangement is designed to accommodate the specific linkage 46 adopted to connect the motor drive to the wiper arms. The relative position of the motor carrier 72 and associated reduction gear carrier 100 in the frame 20 may be adjusted to suit other linkage arrangements, including parallel-style linkages.

It will be appreciated that minimizing weight is an important consideration in the design of the frame and relatively thin sections are maintained throughout. Adjacent the pivot boss terminations 26, 28 (FIG. 6), the frame is strengthened by a Z-shaped cross-sectional profile 118 drawn in ghost outline in FIG. 6. A sediment discharge opening 120 is integrated into the frame at one end of a sediment discharge channel 122 defined by the lowermost leg of the said Z-shaped profile 118.

In use, a motor drive 44 is assembled into the frame 20 and operatively connected to a reduction gear and linkage coupling the motor drive to pivot drive shafts for connection to windshield wiper arms. The frame is then installed in the cowl of a motor vehicle and attached at the mounting slots 34, 36, 42 whereafter windshield wipers are secured to the assembly.

As indicated above, several variations may be made to the above-described embodiment of the invention without departure from the scope of the amended claims. In particular, it will be appreciated that the nature of the linkage does not form part of the invention and that the construction of the modular frame may be varied so as to accommodate various forms of a linkage which might be a series linkage as drawn, or a parallel linkage constructed to drive wipers independently from each other. Other variations within the scope of the claims will be apparent to those skilled in the art.

We claim:

1. A modular support frame for a windshield wiper drive, the support frame comprising:

a unitary body having integrally formed mounting brackets for securing the frame to a vehicle body;

at least one integrally formed pivot boss for receiving a pivot drive shaft rotatable in said boss and driven to reciprocate a windshield wiper, and an integrated motor carrier supporting a motor drive adapted to drive a motor shaft defining a longitudinal axis and coupled to a crank arm forming part of a linkage adapted to rotate said pivot drive shaft, said motor carrier having an integrally formed end plate transverse to said longitudinal axis and apertured for receiving the motor shaft therethrough and an integrally formed splash cover extending from said end plate in a longitudinal direction parallel to said longitudinal axis so as to partly cover a housing for the motor drive, the splash cover being adapted to shield the motor drive from weather and defining a longitudinally-extending opening adapted to axially receive the motor drive for assembly into said support frame.

2. A modular support frame for a windshield wiper drive, the support frame comprising:

a unitary body having integrally formed mounting brackets for securing the frame to a vehicle body;

at least one integrally formed pivot boss for receiving a pivot drive shaft rotatable in said boss and driven to reciprocate a windshield wiper, and an integrated motor carrier supporting a motor drive adapted to drive a motor shaft defining a longitudinal axis and coupled to a crank arm forming part of a linkage adapted to rotate said pivot drive shaft, said motor carrier having an integrally formed end plate transverse to said longitudinal axis and apertured for receiving the motor shaft therethrough and an integrally formed splash cover extending outwardly from said end plate in a longitudinal direction parallel to said longitudinal axis so as to partly cover a housing for the motor drive, the splash cover being adapted to shield the motor drive from weather and defining a longitudinally-extending opening adapted to axially receive the motor drive for assembly into said support frame, the unitary body having an integrated reduction gear carrier supporting a reduction gear having an output shaft coupling the said motor shaft to the said crank arm, the reduction gear carrier having a seat lying in a plane orthogonal to said end plate, and disposed adjacent to said end plate.

3. Modular support frame according to claim 2 having first and second pivot bosses receiving respective pivot drive shafts, and formed at opposite ends of the frame, the splash cover having an extension that terminates at one end of the frame adjacent said first pivot boss, the motor carrier and the reduction gear carrier being disposed between said first and second pivot bosses such that the motor carrier and reduction carrier are closer to said second pivot boss than said first pivot boss, and the reduction gear carrier is disposed between the motor carrier and said second pivot boss.

4. In a modular support frame for a windshield wiper drive, the windshield wiper drive comprising a pivot drive shaft driven to reciprocate a wiper and connected to a linkage coupling the pivot drive shaft to a motor shaft defining a longitudinal axis and forming part of a motor drive mounted to the support frame, the support frame having integrally formed mounting brackets for securing the frame to a vehicle body and at least one integrally formed pivot boss receiving said pivot drive shaft, the improvement in which the frame has an integrated motor carrier supporting said motor drive, the motor carrier having an integrally formed end plate transverse to said longitudinal axis, and apertured for receiving the motor shaft therethrough, an integrally formed splash cover extending from said end plate in a longitudinal direction parallel to said longitudinal axis so as to partly cover a housing for the motor drive, the splash cover being adapted to shield the motor drive from weather and defining a longitudinally-extending opening adapted to axially receive the motor drive for assembly into said support frame.

* * * * *